TORE ERICSSON
INVENTOR.

TORE ERICSSON
INVENTOR.

TORE ERICSSON
INVENTOR.

April 15, 1958  T. ERICSSON  2,830,304
RAISING AND LOWERING MECHANISMS
IN WHEELED HOSPITAL BEDS
Filed July 7, 1954  4 Sheets-Sheet 4

INVENTOR
TORE ERICSSON

United States Patent Office 2,830,304
Patented Apr. 15, 1958

2,830,304

RAISING AND LOWERING MECHANISMS IN WHEELED HOSPITAL BEDS

Tore Ericsson, Djursholm, Sweden, assignor to Aktiebolaget Sangfabriken, Stockholm, Sweden, a corporation of Sweden Application July 7, 1954, Serial No. 441,864

Claims priority, application Sweden December 21, 1953

2 Claims. (Cl. 5—328)

This invention relates to a mechanism in wheeled hospital beds for raising and lowering the bed to permit the wheels to be disengaged from or engaged with the floor.

The primary object of the invention is to provide a mechanism of the kind referred to in such wheeled hospital beds as have vertically movable uprights at the corners of the bed subframe, said uprights being interconnected by means of a lever system and adapted when moved into their lower end positions to raise the bed supporting wheels from the floor. This mechanism is substantially characterized in that the bed subframe is provided with a single pedal pivotally mounted on the bed subframe and hingedly connected with the lever system, said pedal when depressed being adapted to move the uprights downwards into their lower end positions in which they are locked, and on further actuation said pedal is adapted to move the uprights out of their locking positions, spring means which are included in the mechanism being then adapted to lift the uprights so that the supporting wheels will engage with the floor.

Further objects and features of the invention will become apparent from the following description, reference being had to the accompanying drawing illustrating two embodiments of the invention chosen by way of example.

Figure 1:
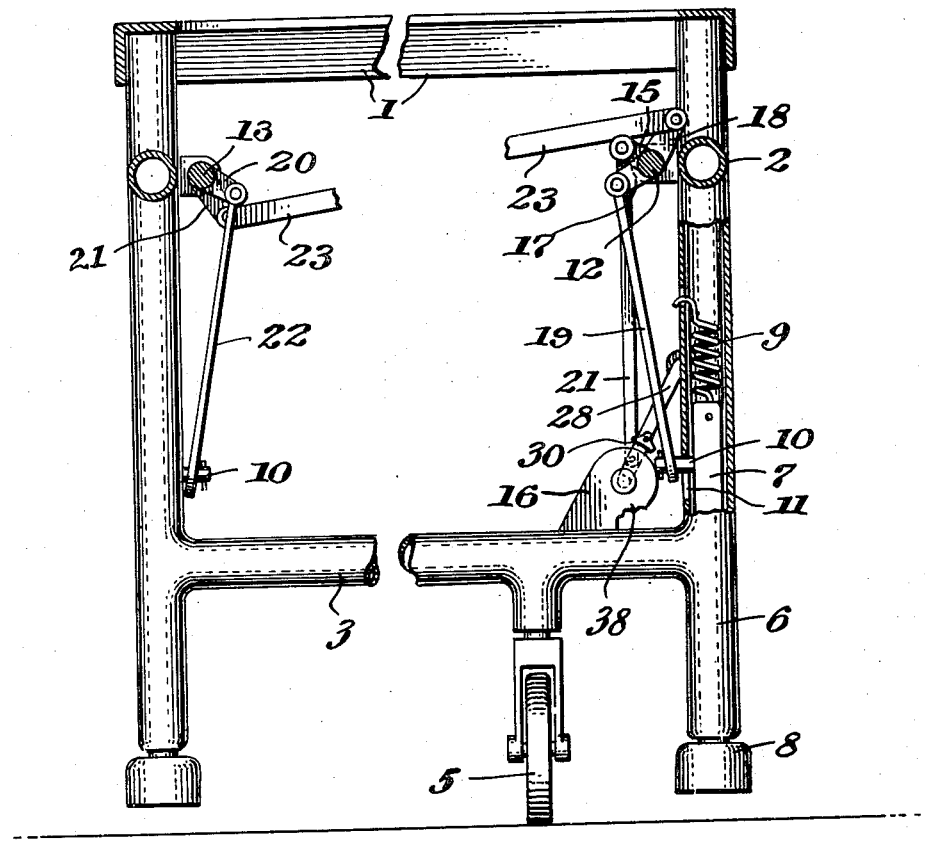
Fig. 1 is an end view of the head portion of the hospital bed according to the invention, with the uprights in their upper end positions.
Figure 2:
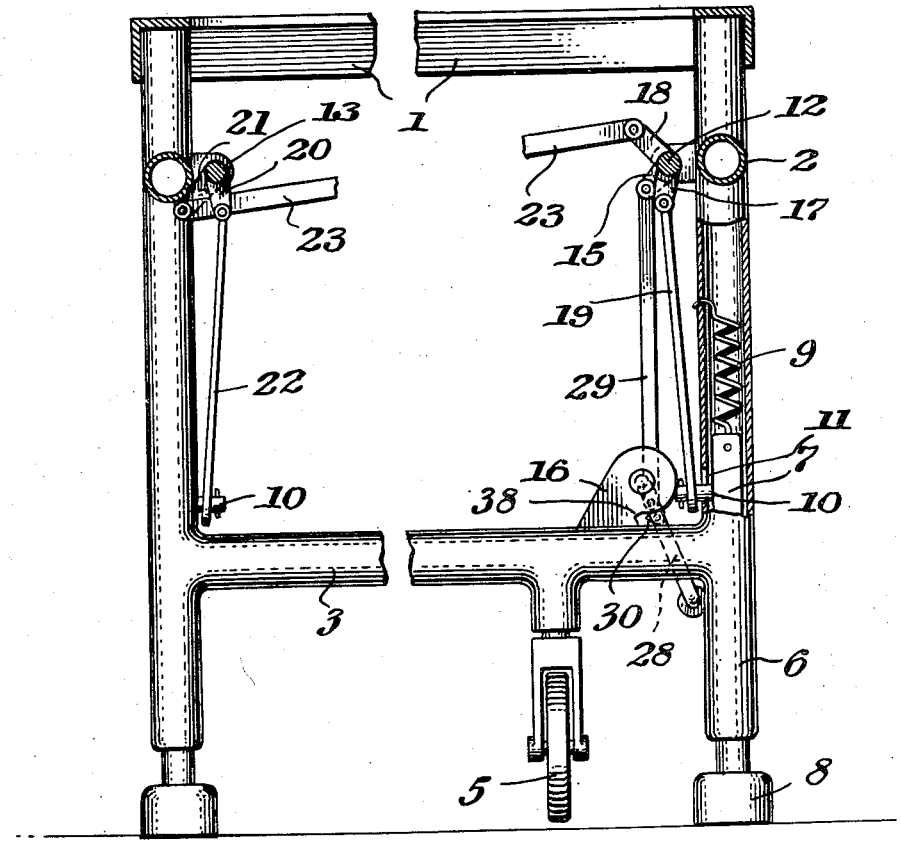
Fig. 2 is an end view of said head portion, with the uprights in their lower end positions.
Figures 3, 4:
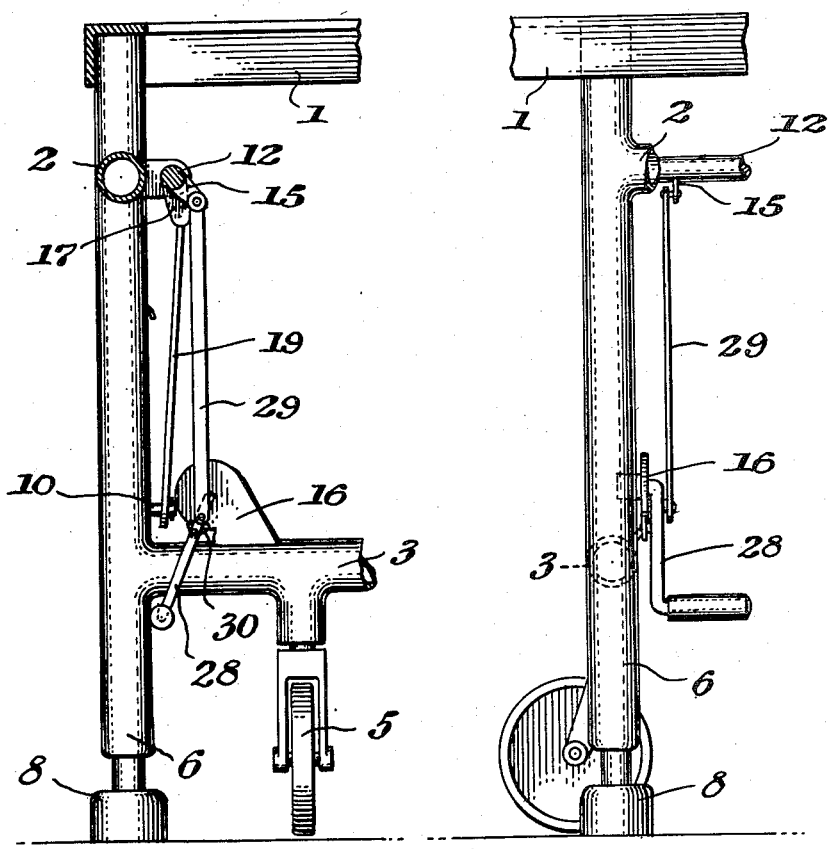
Fig. 3 is an end view of a part of the head portion of the hospital bed viewed from the center of the bed, with the uprights in their lower end positions.
Fig. 4 is a side elevation of the said head portion, with the uprights in their lower end positions.
Figure 5:
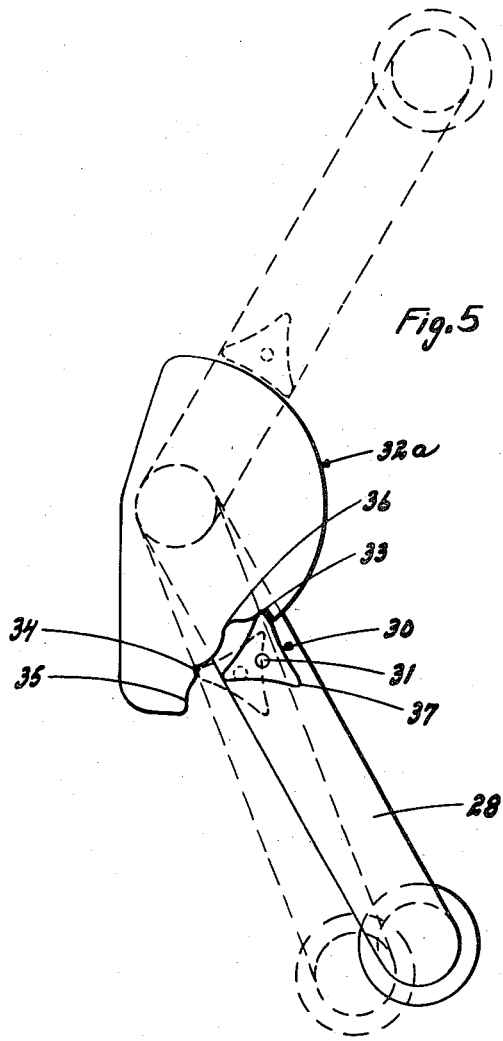

Fig. 5 on a larger scale shows a detail included in the other embodiment.

The mattress carrying frame of the hospital bed is designated 1 and the bed subframe is designated 2, the four supporting wheels 5 of the bed being mounted for swivel motion to the transverse stays 3 of the bed subframe. The legs 6 arranged at the corners of the bed subframe 2 are tubular. Vertically movable in the legs 6 are uprights 7 which at their lower ends are provided with feet 8, and which are united at their upper ends by pull springs 9 which tend to move the uprights 7 to their upper end positions in which the feet 8 bear against the lower end surfaces of the legs 6.

Each of the uprights 7 has a pin 10 projecting towards the longitudinal median axis of the bed and penetrating a longitudinal slot 11 provided in each of the legs 6. Two horizontal shafts 12 and 13 are rotatably mounted on the bed subframe 2.

At the head portion of the bed the shaft 12 carries two arms 17 and 18, one of which 17 is hingedly connected by means of a link 19 to the pin 10 of the upright 7 closest to said pin. The shaft 13, too, carries two arms 20 and 21 at the head portion of the bed. A link 22 hingedly unites the arm 20 with the pin 10 of the closest upright 7. The arms 18 and 21 are hingedly connected with each other by means of a transverse connecting rod 23.

A pedal 28 is pivotally mounted on pedal mounting 16 mounted on the transverse stay 3. This pedal 28 is hingedly connected with the arm 15 on the shaft 12 by means of a link 29 so that said shaft 12 and thus the shaft 13, too, is turned when the pedal 28 is actuated.

The pedal 28 is provided with a latch 30 having substantially the form of an equilateral triangle mounted on the pedal 28 at its centre 31. The latch 30 is adapted to cooperate with a portion of pedal mounting 16 in the form of a locking member 38 having an edge 32 concentric with the pivot point of the pedal 28. This locking member has a locking notch therein which substantially comprises the following four portions: holding notch 33, abutment 34, cam 35 and hollow 36.

At the depression of the pedal 28 one of the three sides of the latch 30 is guided by the edge 32a on locking member 38 until the latch has passed the holding notch 33. When the latch 30 then abuts against the abutment 34, which is a slightly greater distance from the pivot point of pedal 28 than curved edge 32a, it is rotated counter-clockwise as seen in the drawing. When the pressure on the pedal 28 then ceases, one of the locking teeth 37 of the latch 30 bears against the notch 33 and is forced into it. In this position of the pedal 28 the feet 8 are all engaged with the floor whereas the wheels 5 are raised. This position is maintained until the pedal 28 is again actuated, it being given a downward impulse. As a result thereof one of the locking teeth 37 of the latch 30 abuts against the cam 35, which is also a greater distance from the pivot point of pedal 28 than the curved edge 32a, which causes the locking means to turn further counter-clockwise so that the tooth 37 which was earlier locked will cooperate with the hollow 36 at the return of the pedal 28, whereby this return of the pedal into its upper end position will not be prevented by the holding notch 33. At the return of the pedal 28 the springs 9 move the uprights 7 into their upper end positions in which the top surfaces of the feet 8 abut against the lower end surfaces of the legs 6.

While the invention has been described with reference to the embodiments shown in the drawing, it must not be considered as limited to these very embodiments, since many modifications can be resorted to within the scope of the appendant claims.

What I claim and desire to secure by Letters Patent is:

1. In a hospital bed having wheels mounted thereon and with spring loaded vertical uprights slidably mounted within the four corner members of the bedframe and a lever system interconnecting said uprights to move them simultaneously and having a pedal to actuate said system hingedly connected to said lever system, that improvement comprising a locking member having a locking notch therein and a latch member cooperatble therewith one of said members mounted on said bed by said pedal and the other of said members mounted on said pedal, said latch member having a plurality of teeth thereon, and said notch having an abutment surface and a cam surface therein, said latch member cooperating on the one hand with said abutment surface whereby on depression of the pedal the latch member is turned in a direction opposed to the direction of motion of the pedal and on return of the pedal engages one of said teeth in the notch, and on the other hand with said cam surface whereby on depression of the pedal from the locking position one of said teeth engages with said cam surface to make the latch member turn to a position in which the latch member on the return of the pedal is free from the notch, whereby when said pedal is depressed said system is actuated to lower said uprights to raise said bed and said latch member and notch engage to lock said uprights in the lowered position, and on further depression said latch and notch member are disengaged to release said system and uprights.

2. The improvement as claimed in claim 1 in which said latch member is substantially triangular in form and is mounted at its center on the pedal, and a curved edge on said locking member guiding said latch member by cooperation with one of the three sides thereof to the locking notch, said guiding surface being concentric with the center of pivoting of the pedal.

References Cited in the file of this patent
UNITED STATES PATENTS

| | | |
|---|---|---|
| 1,082,160 | Kurowski | Dec. 23, 1913 |

FOREIGN PATENTS

| | | |
|---|---|---|
| 72,771 | Denmark | July 16, 1951 |
| 270,067 | Great Britain | May 5, 1927 |
| 499,506 | Great Britain | Jan. 25, 1939 |